(12) United States Patent
Wang et al.

(10) Patent No.: US 10,176,024 B2
(45) Date of Patent: Jan. 8, 2019

(54) INFORMATION PROCESSING METHOD, DEVICE AND SYSTEM

(71) Applicant: Hexagon Solutions (Qingdao) Co., Ltd., Qingdao, Shandong Province (CN)

(72) Inventors: Min Hua Wang, Qingdao (CN); Clint Harvey, Qingdao (CN)

(73) Assignee: Hexagon Solutions (Qingdao) Co., Ltd., Qingdao (CN)

( * ) Notice: Subject to any disclaimer, the term of this patent is extended or adjusted under 35 U.S.C. 154(b) by 45 days.

(21) Appl. No.: 15/316,906

(22) PCT Filed: Jun. 12, 2015

(86) PCT No.: PCT/CN2015/081349
§ 371 (c)(1),
(2) Date: Dec. 7, 2016

(87) PCT Pub. No.: WO2015/188781
PCT Pub. Date: Dec. 17, 2015

(65) Prior Publication Data
US 2017/0123865 A1  May 4, 2017

(30) Foreign Application Priority Data
Jun. 13, 2014 (CN) .......................... 2014 1 0264516

(51) Int. Cl.
*G06F 9/44* (2018.01)
*G06F 9/54* (2006.01)
*G06F 17/30* (2006.01)

(52) U.S. Cl.
CPC ................ *G06F 9/541* (2013.01); *G06F 9/44* (2013.01); *G06F 17/30569* (2013.01)

(58) Field of Classification Search
CPC ........................... G06F 9/541; G06F 17/30569
See application file for complete search history.

(56) References Cited

U.S. PATENT DOCUMENTS

| 5,646,862 | A  | 7/1997 | Jolliffe et al. |
| 6,453,356 | B1 | 9/2002 | Sheard et al. |

(Continued)

FOREIGN PATENT DOCUMENTS

| CN | 101706738 A | 5/2010 |
| CN | 102760184 A | 10/2012 |

(Continued)

OTHER PUBLICATIONS

International Searching Authority, International Search Report—International Application No. PCT/CN2015/081349, dated Sep. 9, 2015 together with the Written Opinion of the International Searching Authority, 6 pages.

(Continued)

*Primary Examiner* — Charles E Anya
(74) *Attorney, Agent, or Firm* — Nutter McClennen & Fish LLP

(57) ABSTRACT

Embodiments of the present disclosure provide an information processing method, apparatus and system. The method includes: one or more interface adapters, each interface adapter being connected to an outer application system, configured to achieve data interaction and function call between the multiple outer application systems; and a centralized rules engine connected to the one or more interface adapters and configured to use a preset rule to control the data interaction and function call between the multiple outer application systems connected to the interface adapters. Hence, a general interface and control rule is redesigned, application integration can be achieved more easily, extensibility is good, and independence of individual integrated applications is not affected.

17 Claims, 17 Drawing Sheets

(56) References Cited

U.S. PATENT DOCUMENTS

| | | | |
|---|---|---|---|
| 2005/0038911 A1* | 2/2005 | Watanabe | G06Q 10/10 709/246 |
| 2005/0091663 A1 | 4/2005 | Bagsby | |
| 2005/0225778 A1 | 10/2005 | Izumi | |
| 2010/0100809 A1 | 4/2010 | Thomas et al. | |
| 2012/0197718 A1* | 8/2012 | Martchenko | G06Q 30/02 705/14.53 |
| 2013/0232105 A1* | 9/2013 | Moser | H04L 67/2823 707/602 |
| 2014/0316830 A1* | 10/2014 | Langhorne, III | G06Q 10/0631 705/7.12 |
| 2015/0339339 A1* | 11/2015 | Mastrodonato | G06F 17/30368 707/805 |

FOREIGN PATENT DOCUMENTS

| | | |
|---|---|---|
| CN | 102938731 A | 2/2013 |
| WO | WO 96/37817 A1 | 11/1996 |
| WO | WO 03/027813 A2 | 4/2003 |

OTHER PUBLICATIONS

International Searching Authority (English Translation), International Search Report—International Application No. PCT/CN2015/081349, dated Sep. 9, 2015 together with the Written Opinion of the International Searching Authority, 7 pages.

European Patent Office, Extended European Search Report—Application No. 15806031.9-1224, dated Jan. 22, 2018, 11 pages.

\* cited by examiner

INFORMATION PROCESSING METHOD, DEVICE AND SYSTEM

TECHNICAL FIELD

The present disclosure relates to the field of data processing, and in particular to an information processing method, apparatus and system.

BACKGROUND ART

In recent years, various providers provide independent software application systems, and when these mutually independent application systems need to interact, a manner of application integration is usually use. Enterprise resource plan (ERP) and enterprise application integration (EAI) two methods for integrating enterprise applications that are very popular at present.

FIGS. 1 and 2 are schematic diagrams of structures of an ERP system and an EAI system, respectively. As shown in FIGS. 1 and 2, the ERP system mainly forces on closely integrate enterprise applications in a centralized manner, and the EAI system proposes to integrate enterprise applications via an enterprise service bus, so as to form a loose distributed integration mechanism, such as forming a service oriented architecture (SOA).

An object of both ERP and EAI is to perform enterprise integration, including data exchange and business processing. As ERP and EAI need to integrate different applications, a cost is very high. Wherein, ERP is centralized on adaptation to standardization of business processing, and EAI is centralized in mapping and distributed business processing. Relative to ERP, EAI further needs more prior business analysis.

It should be noted that the above description of the background art is merely provided for clear and complete explanation of the present disclosure and for easy understanding by those skilled in the art. And it should not be understood that the above technical solution is known to those skilled in the art as it is described in the background art of the present disclosure.

SUMMARY OF THE DISCLOSURE

It was found by the inventors in implementation of the above contents that following problems exist in the prior art.

FIGS. 3 and 4 are schematic diagrams of interface setting in integrating different applications in the prior art. As shown in FIG. 3, in order that communication may be performed between applications 1, 2, 3 and 4, 12 interfaces need to be provided. As shown in FIG. 4, even if each interface is bidirectional, 6 interfaces need to be provided. Hence, such an integration technique wastes a large amount of time and resources, as it needs to establish different interaction interfaces between each two applications. When versions of the applications provided by a provider are updated, the established interfaces need to be updated or modified, which also spends a large amount of resources. And after new applications are introduced, the number of interfaces is increased, resulting in excessive interfaces, low expandability, and poor user experiences.

In the prior art, in order to solve a problem of excessive interaction interfaces, an integration system is proposed. FIG. 5 is a schematic diagram of a structure of the integration system. As shown in FIG. 5, in a conventional method of platform integration, as the applications provided by providers are different, interfaces of the applications used for connecting the platform and the applications are also various, and each interface can only be used by an independent application separately. Thus, the data interaction between the applications and the platform can only be performed via specific interfaces, and communication cannot be performed directly between the applications. Such a method also consumes a large amount of resources, and maintenance and implantation after update of the applications are also uneasy.

For example, EAI often uses private standards based on customization of enterprises where EAI is implemented. An advantage of being based on private standards is reducing a pressure of an EAT intermediate layer on translation transform of an application message to a certain extent, which may improve the integral performance of the EAI in case of less application systems. However, private standards will also bring about loss to flexible expandability of enterprise integration. When an enterprise introduces new applications, or when an application needs to be largely changed, adaptability of the EAI bus will become very tender. During continuous increase of enterprise scale, difficulty of integration of the newly-introduced applications will be exponentially increased due to difference of the standards. In the implementation of enterprise application integration in the EAI manner, the adapters, intermediate layer message transform rules and message routing developed in it are all closely coupled, and when the new applications are integrated in the EAI, part of the existing adapters, intermediate layer message transform rules and message routing need to be modified, and cannot be reused.

Embodiments of the present disclosure provide an information processing method, apparatus and system. By redesigning general interface and control rule, application integration can be achieved more easily, extensibility is good, and independence of individual integrated applications is not affected, thereby solving the above technical problems.

According to a first aspect of the embodiments of the present disclosure, there is provided an information processing apparatus, including:

one or more interface adapters, each interface adapter being connected to an outer application system, configured to achieve data interaction and function call between the multiple outer application systems; and a centralized rules engine connected to the one or more interface adapters and configured to use a preset rule to control the data interaction and function call between the multiple outer application systems connected to the interface adapters.

According to a second aspect of the embodiments of the present disclosure, there is provided an information processing method, including:

receiving, by an interface adapter, data and control information transmitted by an outer application system; and converting the data and control information from the outer application system by the interface adapter into a predefined data structure, and transmitting it to a centralized rules engine, so that the centralized rules engine controls data interaction and function call between the multiple outer application systems connected to the multiple interface adapters according to a preset rule.

According to a third aspect of the embodiments of the present disclosure, there is provided an information processing method, including:

receiving by a centralized rules engine, a predefined data structure converted from data and control information from outer application systems transmitted via interface adapters;

controlling data interaction and function call between the multiple outer application systems connected to the multiple interface adapters by the centralized rules engine according to a preset rule.

According to a fourth aspect of the embodiments of the present disclosure, there is provided an information processing system, including at least one information processing apparatus as described in the first aspect;

wherein, the information processing apparatus is connected to multiple outer application systems via interface adapters, and uses a preset rule to control, so as to achieve data interaction and function call between the multiple outer application systems.

An advantage of the embodiments of the present disclosure exists in that with the information processing method, apparatus and system of the embodiments of the present disclosure, application integration can be achieved more easily, extensibility is good, and independence of individual integrated applications is not affected.

With reference to the following description and drawings, the particular embodiments of the present disclosure are disclosed in detail, and the principle of the present disclosure and the manners of use are indicated. It should be understood that the scope of the embodiments of the present disclosure is not limited thereto. The embodiments of the present disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. To facilitate illustrating and describing some parts of the disclosure, corresponding portions of the drawings may be exaggerated or reduced. Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

In the drawings.

DETAILED DESCRIPTION OF THE DISCLOSURE

The foregoing and other features of the embodiments of the present disclosure shall become apparent with reference to the drawings and the following description. These embodiments are illustrative only, and are not intended to limit the present disclosure. For the principle and implementations of the present disclosure to be easily understood by those skilled in the art, the embodiments of the present disclosure shall be described taking that the application is software or hardware independent of other applications or systems as an example. However, it should be understood that the embodiments of the present disclosure are not limited to the above application.

Preferred embodiments of the present disclosure shall be described below with reference to the accompanying drawings.

Embodiment 1

Figure 1:
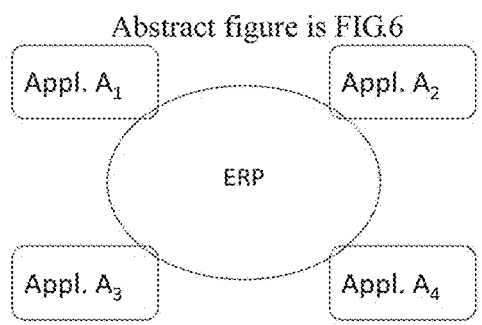
FIG. 1 is a schematic diagram of a structure of an ERP system in the prior art.
Figure 2:
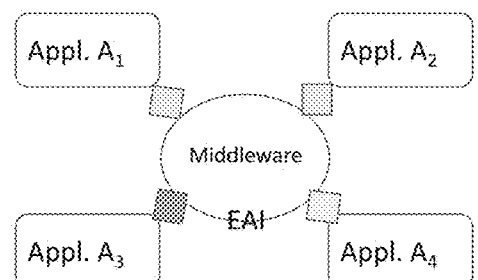
FIG. 2 is a schematic diagram of a structure of an EAI system in the prior art.
Figure 3:
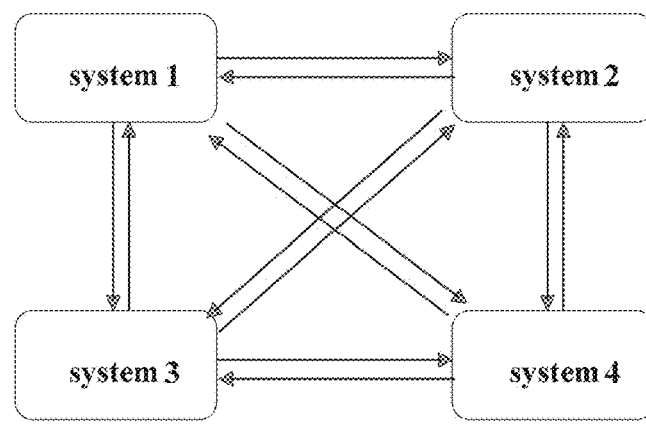
FIG. 3 is a schematic diagram of interface setting in integrating different applications in the prior art.
Figure 4:
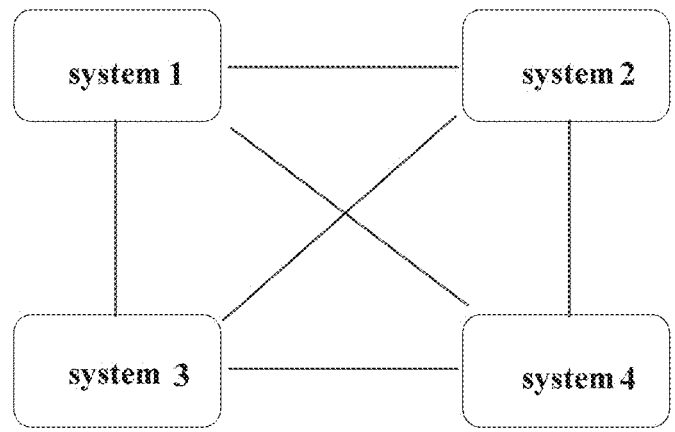
FIG. 4 is a schematic diagram of interface setting in integrating different applications in the prior art.
Figure 5:
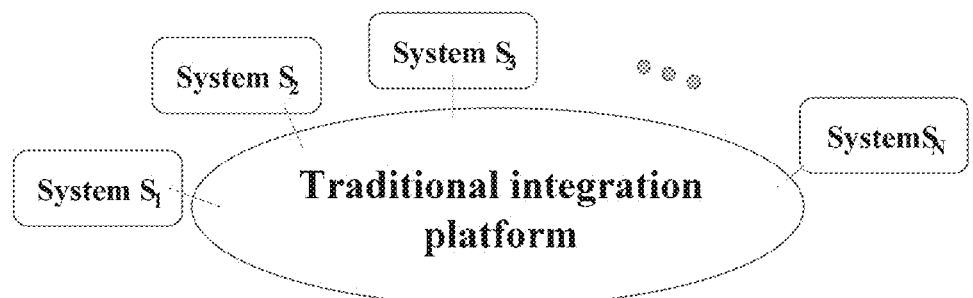
FIG. 5 is a schematic diagram of a structure of an integrating system in the prior art.
Figure 6:
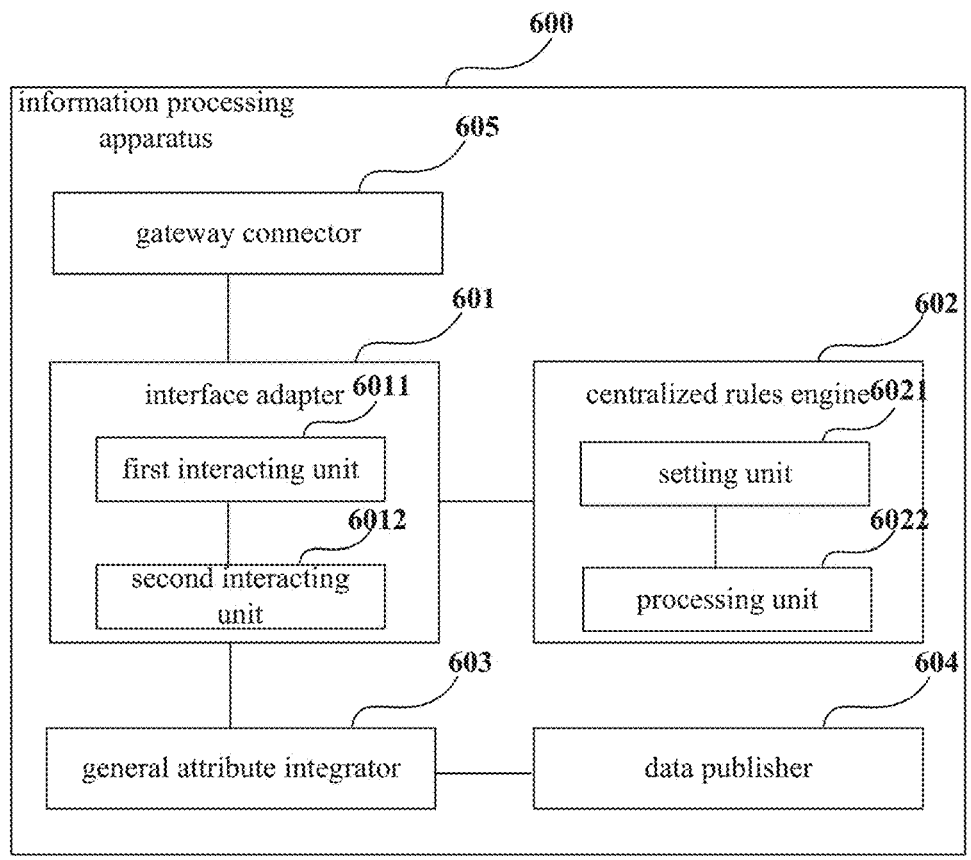
FIG. 6 is a schematic diagram of a structure of an information processing apparatus of Embodiment 1 of the present disclosure.

An embodiment of the present disclosure provides an information processing apparatus, FIG. 6 is a schematic diagram of a structure of the information processing apparatus of Embodiment 1 of the present disclosure. Referring to FIG. 6, the information processing apparatus 600 includes:

one or more interface adapters 601, each interface adapter 601 being connected to an outer application system, configured to achieve data interaction and function call between the multiple outer application systems; and a centralized rules engine 602 connected to the one or more interface adapters 601 and configured to use a preset rule to control the data interaction and function call between the multiple outer application systems connected to the interface adapters 601.

In this embodiment, the information processing apparatus 600 may be referred to as a. platform, the interface adapter 601 may be referred to as a smart interface adapter (SIA), and the centralized rules engine 602 may be referred to as a rules engine (RE).

The information processing apparatus 600 may include one or more interface adapters 601, each interface adapter 601 being connected to the outer application system, so as to achieve data interaction and function call between the outer application system and other outer application systems. On the one hand, the interface adapter 601 performs data interaction and function call with applications provided by different providers via different protocols; and on other hand, the interface adapter 601 communicates with the centralized rules engine 602 of the information processing apparatus 600 via a predefined communication mechanism. Hence, when a corresponding outer application system is updated or needs to be implanted, such a loose coupling feature is advantageous to improvement of maintenance efficiency, and facilitates implantation of an outer application system.

In this embodiment, the interface adapter 601 may be connected to the outer application system via an application programming interface (API) or a dynamic link library (DLL) of an outer application.

In this embodiment, the outer application system may interact with other outer application systems with respect to its operational data, and state data, etc., via the interface adapter 601, or may call functions of other outer application systems to which the interface adapter 601 is connected, and the functions of itself may also be called by other applications via the interface adapter 601.

In an implementation, the interface adapter 601 includes: a first interacting unit 6011 configured to convert data from the outer application system into a first predefined data structure; and a second interacting unit 6012 configured to convert control information from the outer application system into a second predefined data structure.

For example, the data from the outer application system may be of data formats defined in a transmission control protocol (TCP), a user datagram protocol (UDP), an Internet protocol (IP), or other transmission protocols, and may also be data stored in a database of the outer application system, and the first interacting unit 6011 may convert the above data into the first predefined data structure and transmit it. Hence, the data of the various outer application systems connected to the information processing apparatus are outputted in unified data formats after passing through the first interacting unit 6011, so that communication is performed between the various outer application systems.

In this embodiment, the function call of the outer application system may be converted into the second predefined data structure by the second interacting unit 6012, and is achieved by the interface adapter 601, or may be achieved by the API or DLL of the outer application.

Figure 7:
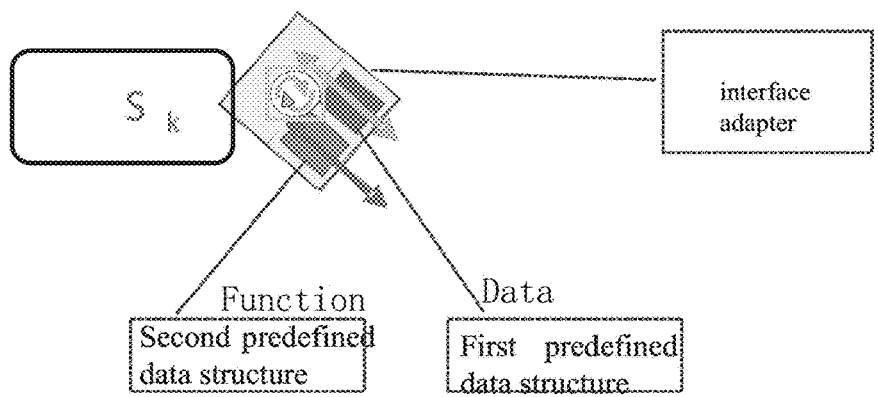
FIG. 7 is a schematic diagram of a structure of an interface adapter 601 of Embodiment 1 of the present disclosure.
Figure 8:
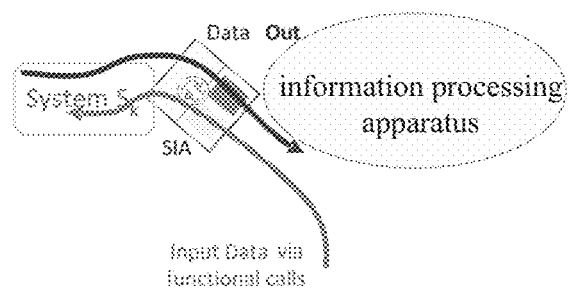
FIG. 8 is a schematic diagram of data streams between the outer application system and the information processing apparatus of Embodiment 1 of the present disclosure.

FIG. 7 is a schematic diagram of a structure of the interface adapter 601. As shown in FIG. 7, in the interface adapter 601, interaction of data and functions is achieved by different interacting units. FIG. 8 is a schematic diagram of data streams between the outer application system and the information processing apparatus. As shown in FIG. 8, such information of the outer application system as an operational state, etc. is outputted via the interface adapter 601, and information on operational states of other outer application systems is inputted into the outer application system via the API or DLL of the outer application system in a manner of function call or web service call.

In this embodiment, the interface adapter 601 may be connected to the application in a wired or wireless manner, hence, the information processing apparatus may achieve remote control of the application, so as to form a distributed system architecture.

Figure 9:
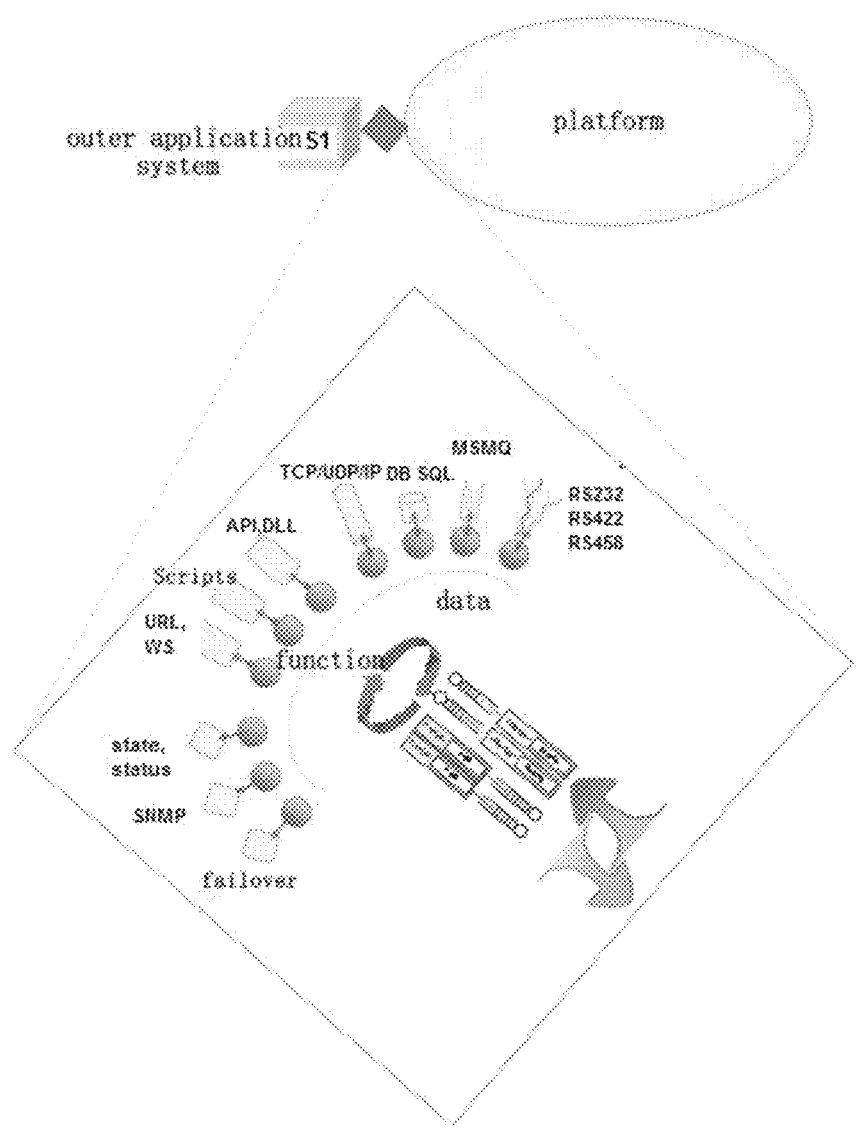
FIG. 9 is a schematic diagram of a connection manner of an interface adapter 601 of Embodiment 1 of the present disclosure.
Figure 10:
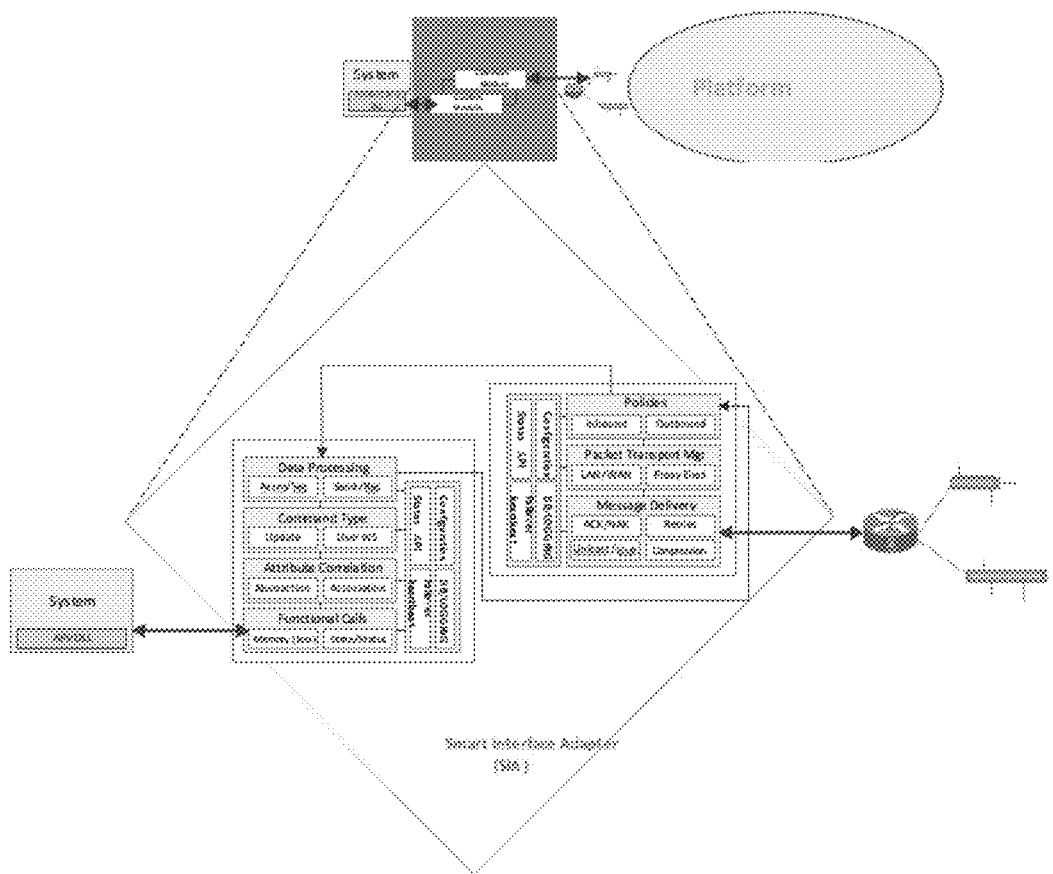
FIG. 10 is a schematic diagram of a connection manner of an interface adapter 601 of Embodiment 1 of the present disclosure.

FIGS. 9 and 10 are schematic diagrams of two connection manners of the interface adapter 601. As shown in FIG. 9, the interface adapter communicates with the outer application system via the Internet. As shown in FIG. 10, the interface adapter performs remote implementation, and data and functions are transmitted to the information processing apparatus in an LAN or WAN manner, so as to perform information interaction with other outer application systems. In an particular implementation, a particular connection manner may be determined according to a type of the API of the outer application system. However, what described above is illustrative only, and this embodiment is not limited thereto.

In this embodiment, the interface adapter 601 may be carried out based on a configured file, and by modifying setting of the configured file, actions of the interface adapter 601 may be dynamically controlled.

Figure 11:
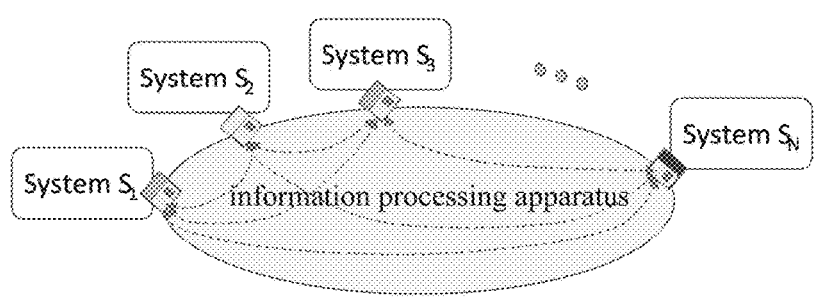
FIG. 11 is a schematic diagram of performing communication between multiple interface adapters 601 of Embodiment 1 of the present disclosure.

FIG. 11 is a schematic diagram of performing communication between multiple interface adapters of the information processing apparatus of this embodiment. As shown in FIG. 11, as the first and second interacting units of the interface adapters can output identical data structure, data interaction and function call of various outer application systems may be facilitated.

Figure 12:
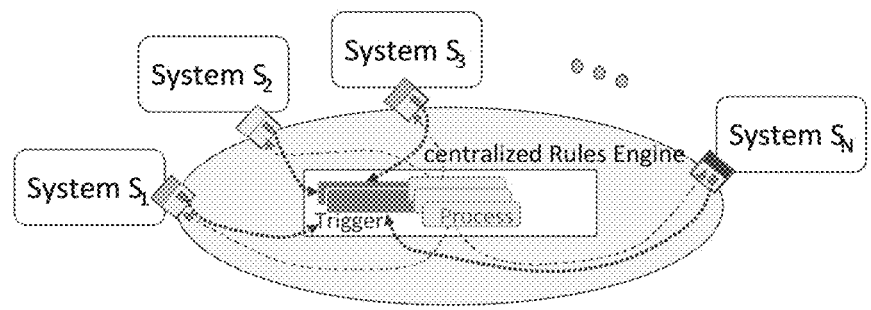
FIG. 12 is a schematic diagram of a rule set by a setting unit 6021 of Embodiment 1 of the present disclosure.

In this embodiment, the centralized rules engine 602 includes: a setting unit 6021 and a processing unit 6022. Wherein, the setting unit 6021 is configured to preset the rule, the rule comprising a triggering condition and corresponding processing to be performed; and the processing unit 6022 is configured to perform the corresponding processing according to the rule when the triggering condition is satisfied. FIG. 12 is a schematic diagram of the set by the setting unit 6021. As shown in FIG. 12, information from an outer application system is inputted into the centralized rules engine 602, and the corresponding processing is performed according to the rule when the triggering condition is satisfied.

Figure 13:
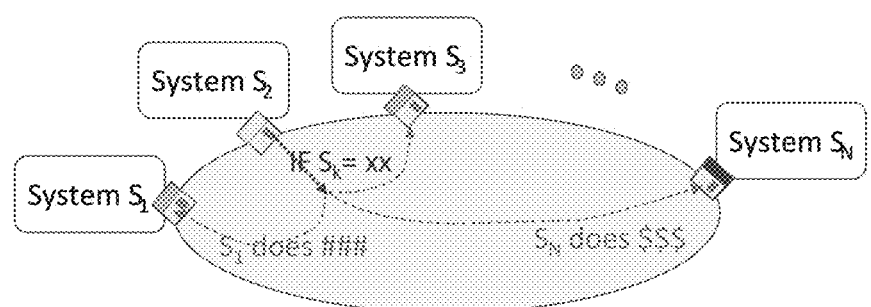
FIG. 13 is a schematic diagram of a rule set by a setting unit 6021 of Embodiment 1 of the present disclosure.

In this embodiment, the setting unit 6021 sets the rule according to one piece of the following information or a combination thereof: information of result drive, event drive, time drive and state drive. For example, FIG. 13 is a schematic diagram of the rule set by the setting unit 6021. When the setting unit 6021 sets the rule according to the state drive, the rule may be set as that when a state of an outer application system $S_1$ is P1, the processing unit 6022 performs corresponding processing P2 and P3 to outer application systems $S_2$ and $S_3$. Wherein, the setting unit 6021 may perform setting of more complicated conditions and processing in a logic and/or manner, and this embodiment is not limited thereto.

With the centralized rules engine of this embodiment, even if each of the outer applications connected to the information processing apparatus keeps its independence, the information processing apparatus may still perform synchronization of data, hence excessive databases need not to be provided in the information processing apparatus or other application for storing data from the outer application, and efficiency of the information processing apparatus may further be improved.

Figure 14:
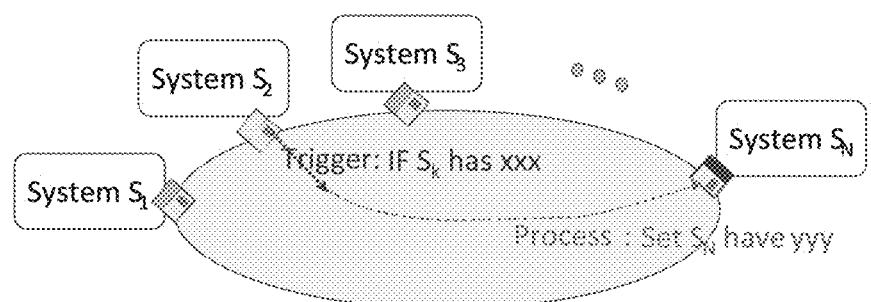
FIG. 14 is a schematic diagram of achieving synchronization by a centralized rules engine 602 of Embodiment 1 of the present disclosure.

FIG. 14 is a schematic diagram of achieving synchronization by the centralized rules engine 602 of this embodiment. As shown in FIG. 14, when an outer application system $S_k$ has an attribute X, the centralized rules engine 602 may set an attribute of $S_N$ as Y.

Figure 15:
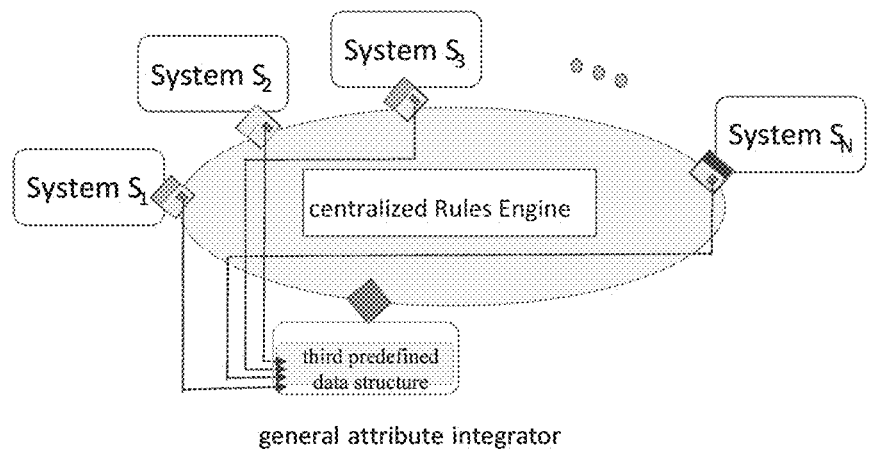
FIG. 15 is a schematic diagram of an implementation of a general attribute integrator of Embodiment 1 of the present disclosure.

In this embodiment, in order that the data and functions of each of the outer applications connected to the information processing apparatus may be reliably and dynamically provided to other information processing apparatus, the information processing apparatus 600 may further include a general attribute integrator 603 configured to receive data or control information transmitted by the multiple interface adapters 601, and convert the data or the control information into a third predefined data structure. Wherein, a format of the third predefined data structure may satisfy any industry standard or published protocol, such as XML, JSON, or other formats defined in other standard protocols. FIG. 15 is a schematic diagram of an implementation of the general attribute integrator. As shown in FIG. 15, data from each independent outer application system may be converted into the third predefined data structure by the general attribute integrator.

In this embodiment, in order that other clients share the same data at the same time and data transmission is not affected by a distance between another client and the information processing apparatus and different connection manners, the information processing apparatus 600 may further include a data publisher 604 configured to publish the data structure converted by the general attribute integrator 603, so as to provide services to multiple outer clients.

Figure 16:
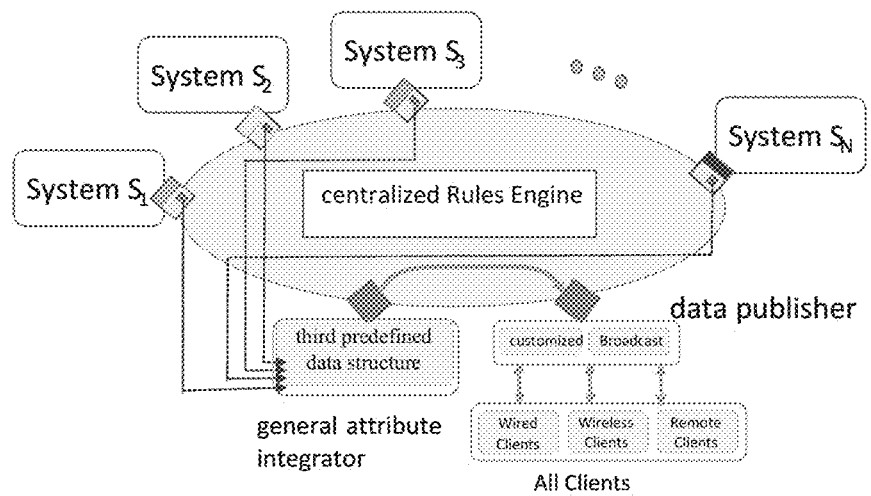
FIG. 16 is a schematic diagram of an implementation of a data publisher of Embodiment 1 of the present disclosure.
Figure 17:
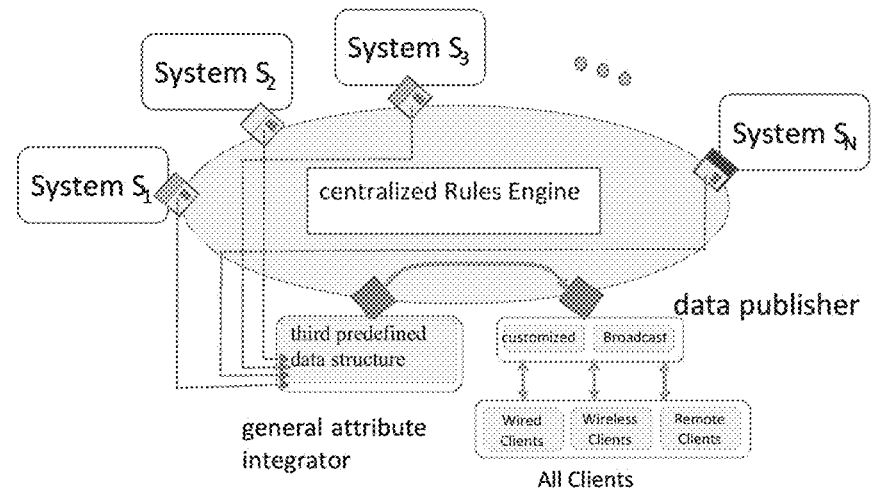
FIG. 17 is a schematic diagram of an implementation of a data publisher of Embodiment 1 of the present disclosure.

In this embodiment, the data publisher may publish data in a broadcast or customized manner, so that they are used by other outer clients. Wherein, the broadcast manner may save transmission bandwidths, and the customized manner may make an independent outer application system customize data according to a demand of its own. FIGS. 16 and 17 are schematic diagrams of implementations of the data publisher. As shown in FIGS. 16 and 17, data or functions from an outer application system are transmitted to the data publisher after being converted by the general attribute integrator, so as to provide services to multiple outer clients, such as a wired client, a wireless client, and a remote client, etc.

In this embodiment, the information processing apparatus 600 may further include a gateway connector 605 configured to be connected to the interface adapters 601 and other information processing apparatuses, so as to achieve data interaction and function call between different information processing apparatuses. Wherein, the gateway connector 605 may be connected to another information processing apparatus or may be connected to multiple other information processing apparatuses at the same time.

Figure 18:
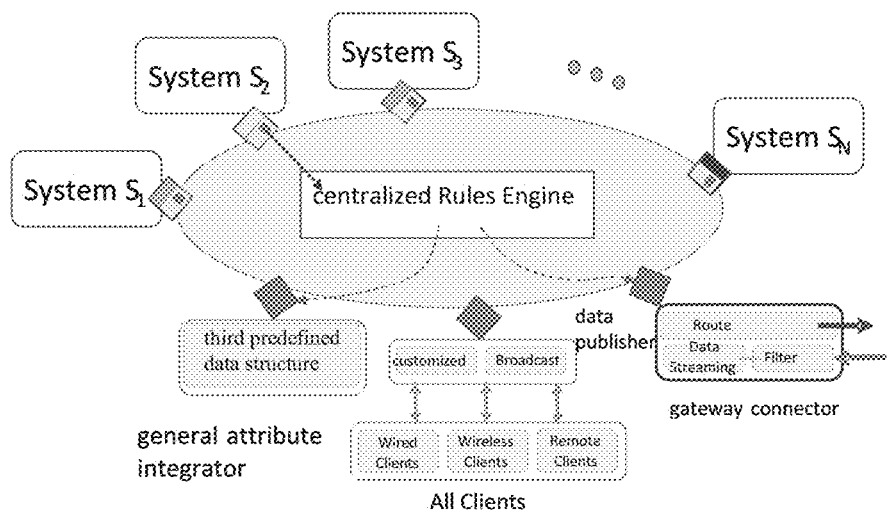
FIG. 18 is a schematic diagram of a connection manner of a gateway connector of Embodiment 1 of the present disclosure.
Figure 19:
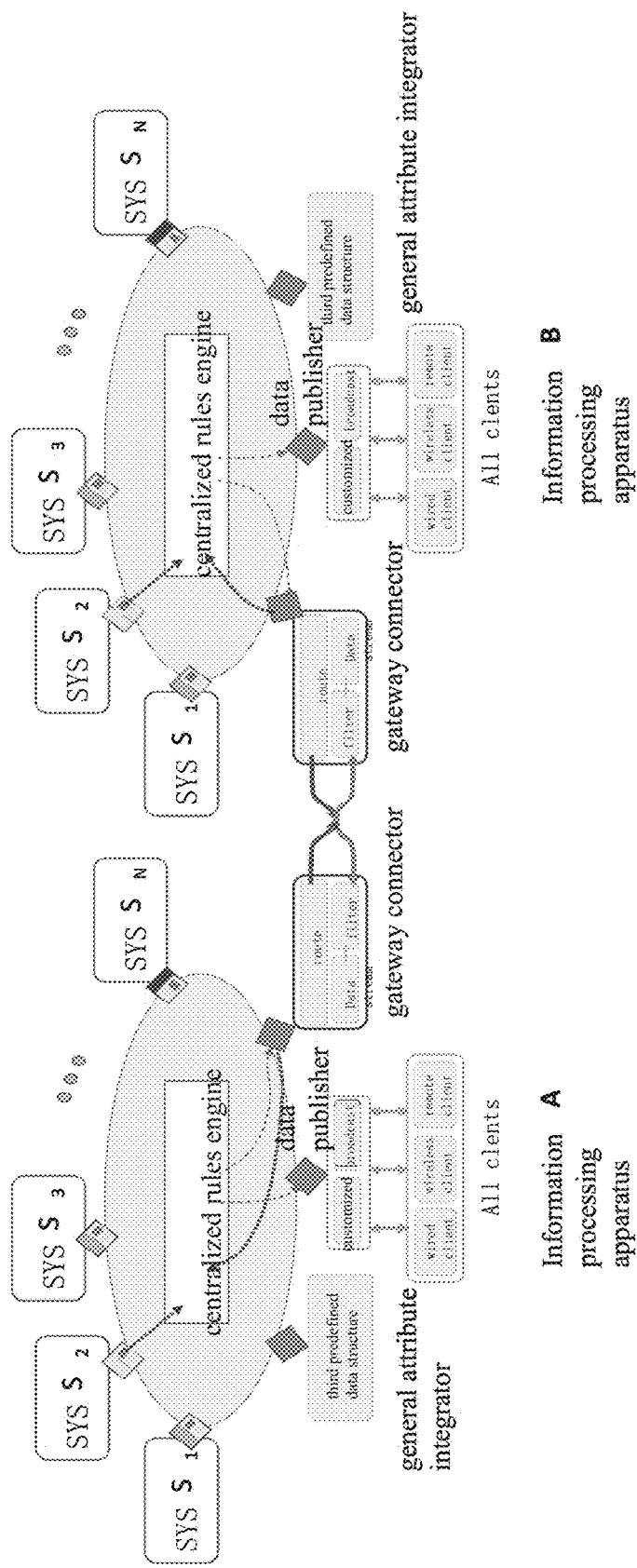
FIG. 19 is a schematic diagram of a connection manner of a gateway connector of Embodiment 1 of the present disclosure.
Figure 20:
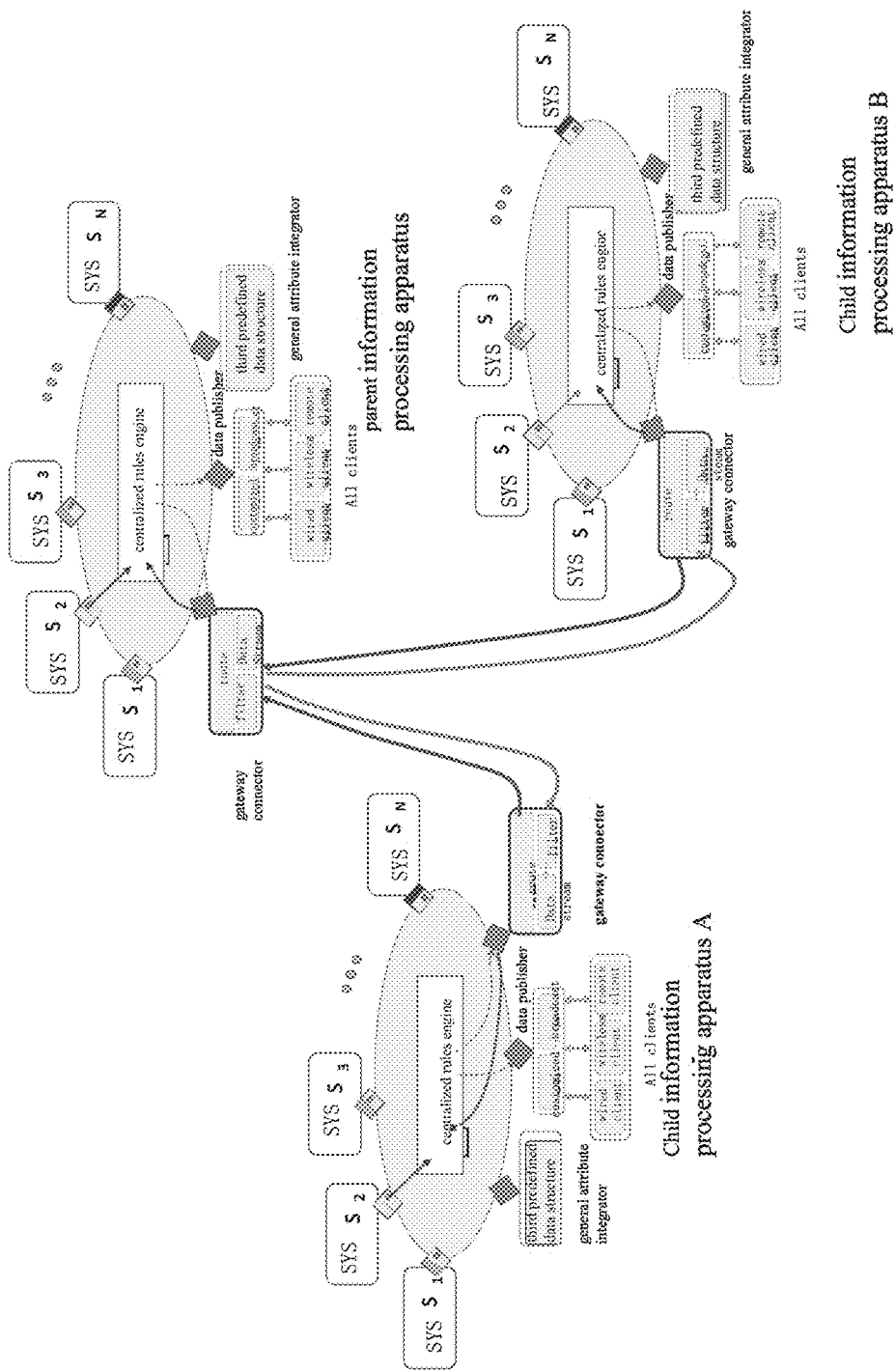
FIG. 20 is a schematic diagram of a connection manner of a gateway connector of Embodiment 1 of the present disclosure.

FIGS. 18, 19 and 20 are schematic diagrams implementations of the gateway connector. Wherein, FIG. 19 is an example of connecting different information processing apparatuses by the gateway connector in a point-to-point manner, and FIG. 20 is an example of connecting different information processing apparatuses by the gateway connector in "a parent point-to-child point" manner.

In this embodiment, the general attribute integrator 603 may be referred to as a common attribute integration (CAI), the data publisher 604 may be referred to as a data publishing server (DPS), and the gateway connector 605 may be referred to as a platform gateway (PG).

In this embodiment, in order to facilitate a user to manipulate the information processing apparatus, the information processing apparatus 600 may further include a display operator configured to display and operate data and control information outputted by the interface adapters 601.

For example, the display operator may be carried out by using GUI, may set the rule in the setting unit 6021, and may set a representation manner of the data converted by the general attribute integrator 603; however, this embodiment is not limited thereto.

With the information processing apparatus of this embodiment, a general interface and control rule is redesigned, application integration can be achieved more easily, extensibility is good, and independence of individual integrated applications is not affected.

Figure 21:
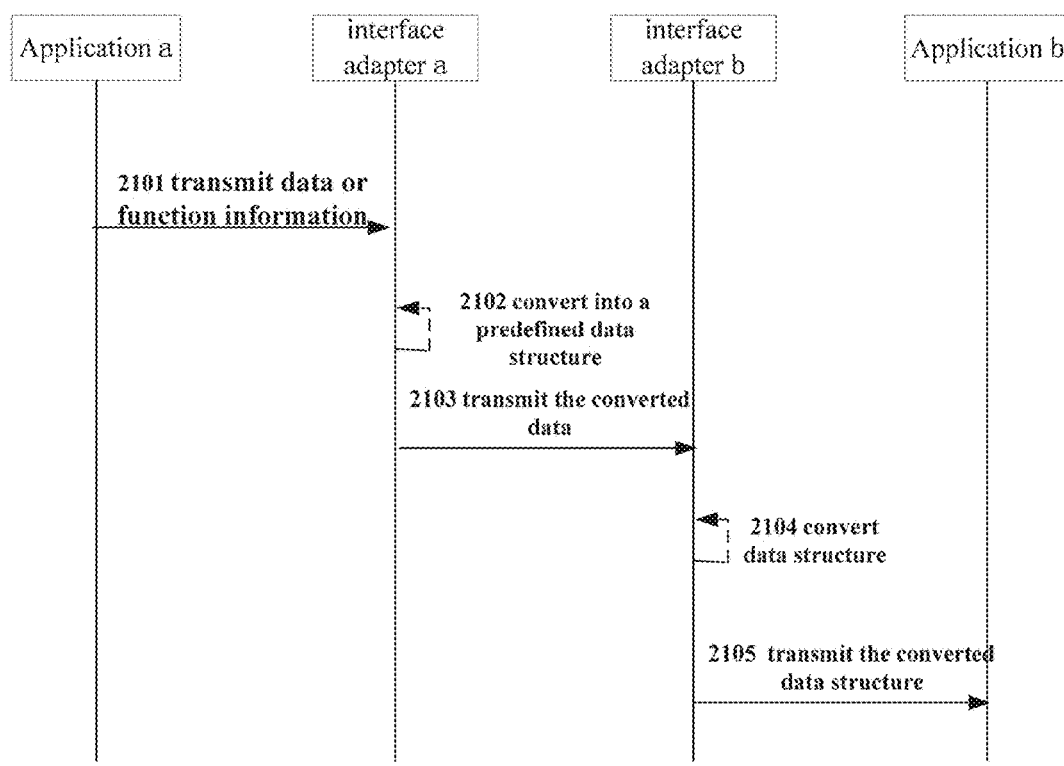
FIG. 21 is a flowchart of an information processing method of Embodiment 1 of the present disclosure.

FIG. 21 is a flowchart of the information processing method of the embodiment of the present disclosure, which is applicable to the above information processing apparatus. As shown in FIG. 21, the method includes:

step 2101: transmitting, by an outer application system operational data, state data, and functions, etc., of itself, to an interface adapter a;

step 2102: converting the data from the outer application system a into a first or second predefined data structure by the interface adapter a;

step 2103: transmitting the first or second predefined data structure to an interface adapter b by a centralized rules engine (not shown);

step 2104: converting the data by the interface adapter b into a data structure of an outer application system b; and step 2105: transmitting the data by the interface adapter b to the outer application system b, so that the outer application system b can conveniently acquire information of the outer application system a.

Figure 22:
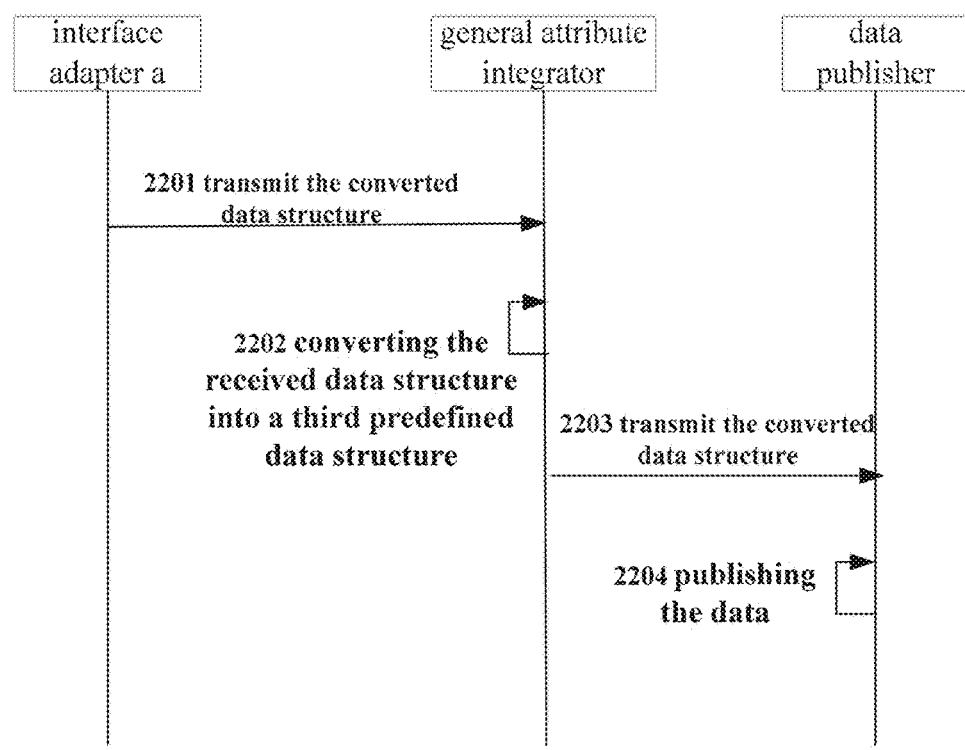
FIG. 22 is another flowchart of an information processing method of Embodiment 1 of the present disclosure.

FIG. 22 is another flowchart of the information processing method of the embodiment 1 of the present disclosure, which is applicable to the above information processing apparatus. As shown in FIG. 22, the method includes:

step 2201: transmitting the first or second predefined data structure converted by the interface adapter a to a general attribute integrator;

step 2202: converting the data structure transmitted by the interface adapter a by the general attribute integrator into a third predefined data structure;

step 2203: transmitting the third predefined data structure to a data publisher; and step 2204: publishing the received data by the data publisher in a broadcast or customized manner.

Figure 23:
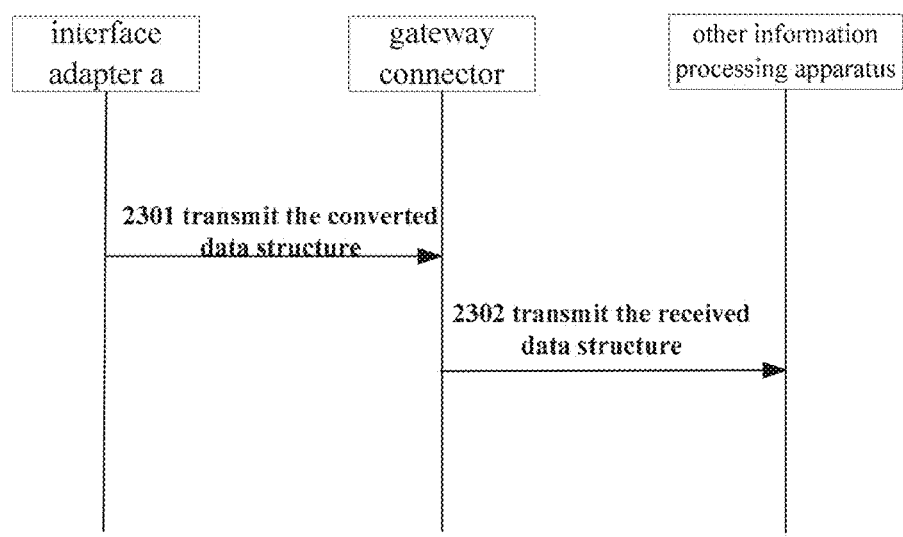
FIG. 23 is a further flowchart of an information processing method of Embodiment 1 of the present disclosure.

FIG. 23 is a further flowchart of the information processing method of the embodiment 1 of the present disclosure, which is applicable to the above information processing apparatus. As shown in FIG. 23, the method includes:

step 2301: transmitting the first or second predefined data structure converted by the interface adapter a to a gateway connector via an interface adapter c (not shown) connected to the gateway connector; and step 2302: transmitting the received data structure by the gateway connector to other information processing apparatus.

It should be noted that the procedures in FIGS. 21-23 may be performed independently, or may be performed in a combined manner, and a particular implementation may be determined according to an actual situation.

Figure 24:
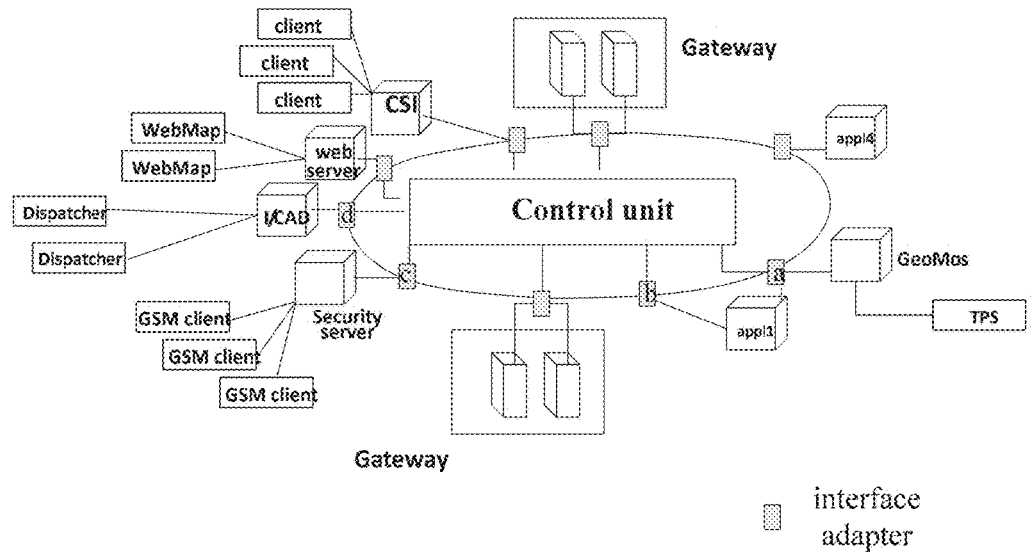
FIG. 24 is a schematic diagram of a structure of a landslide security management apparatus of Embodiment 1 of the present disclosure.
Figure 25:
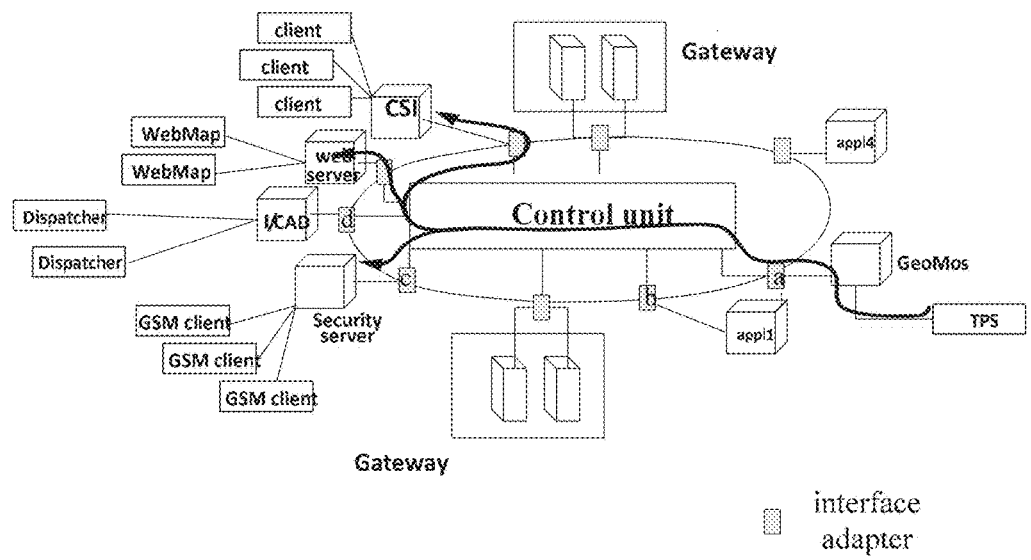
FIGS. 25-28 are schematic diagrams of control rules between outer application systems set by centralized rules engine of the embodiment of the present disclosure.
Figure 26:
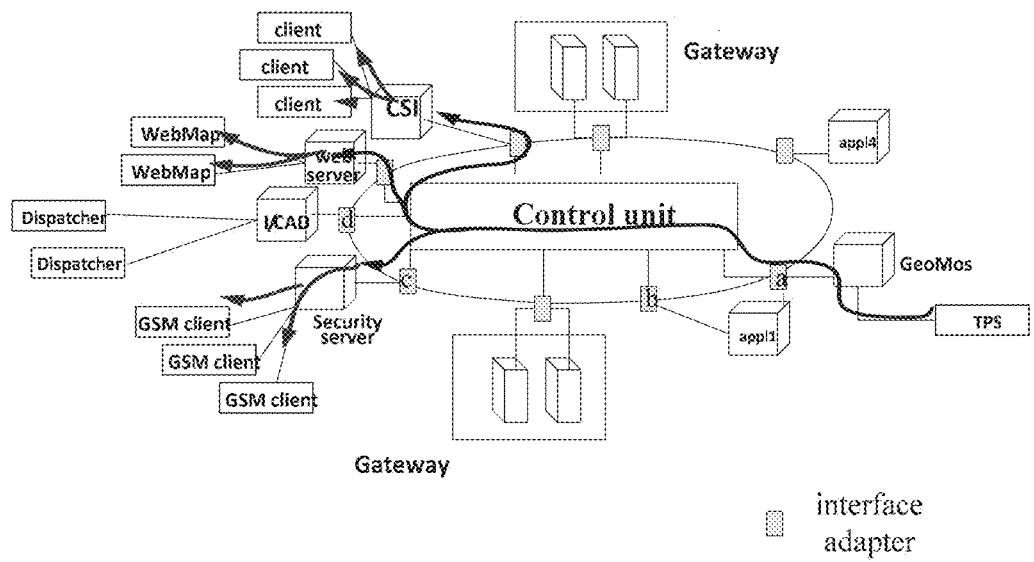
Figure 27:
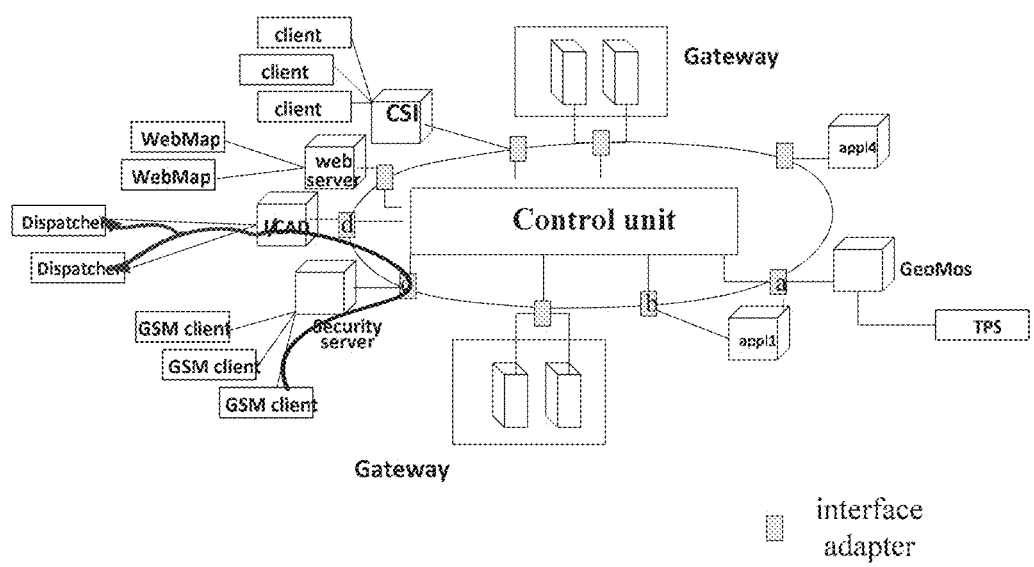
Figure 28:
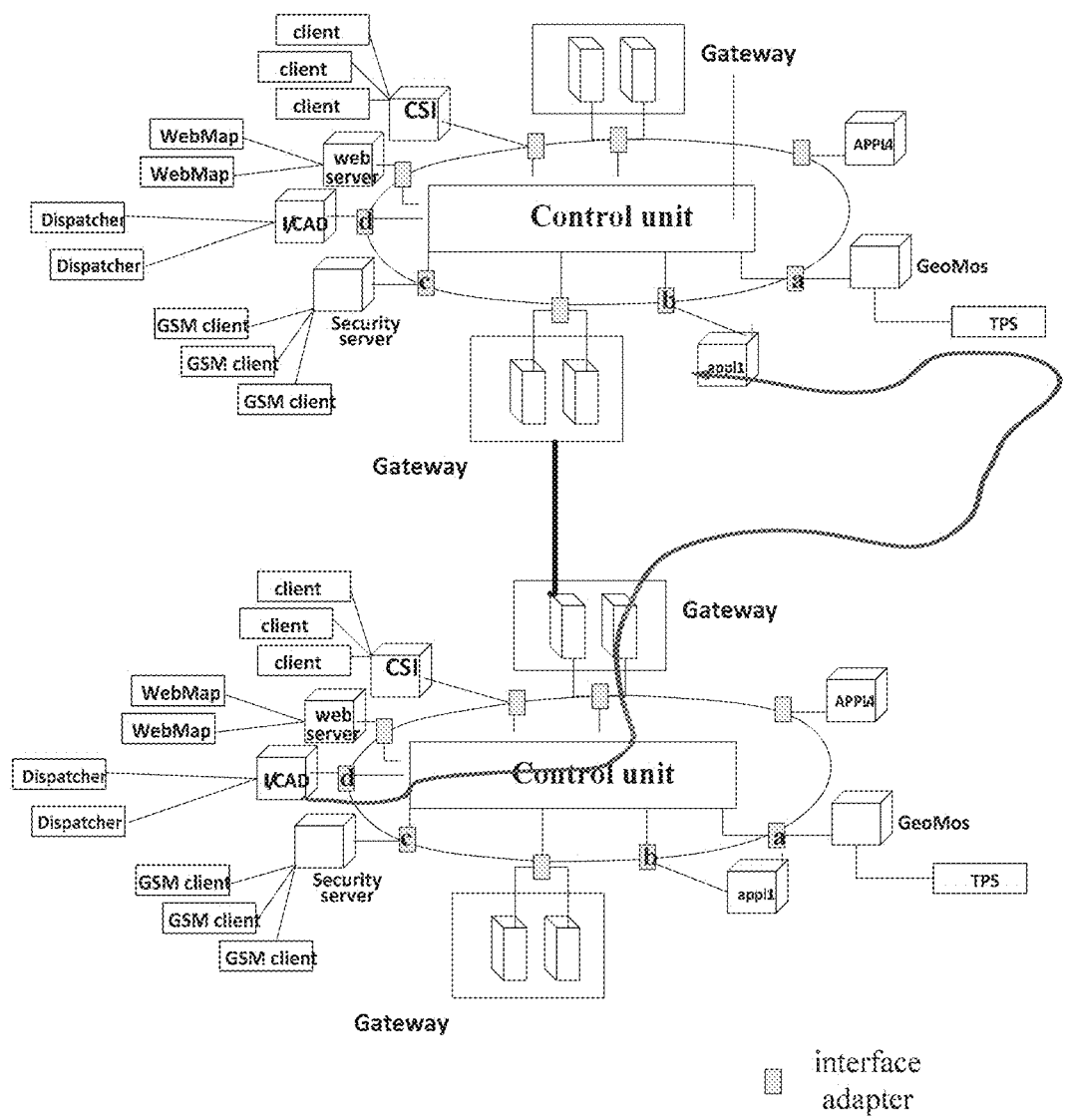

The above information processing method shall be illustrated by way of a particular implementation. Wherein, the information processing apparatus may be applicable to a landslide management system. FIG. 24 is a schematic diagram of a structure of the landslide security management apparatus, and FIGS. 25-28 are schematic diagrams of control rules between outer application systems set by the centralized rules engine. As shown in FIGS. 25-28, when landslide is detected by a total position station (TPS), related incidents will be stored in a GeoMoS database, the information processing apparatus is connected to a GeoMoS application system via the interface adapter a, the interface adapter a receives the data stored in the GeoMoS (step 2101), converts the data into a predefined data structure (step 2102), and transmits the data to another application system connected to the interface adapter b of the information processing apparatus (step 2103), the data converted by the interface adapter a are transmitted to a common sensor interface (CSI, corresponding to the general attribute integrator) (step 2201), and the CSI converts the received data into the third predefined data structure, such as a JavaScript Object Notation stream (step 2202), and publishes the converted JSON steam on a map client of a geographic information system (GIS) (steps 2203 and 2204).

Furthermore, the data converted by the interface adapter a may be transmitted to a security and guard management application connected to the interface adapter c of the information processing apparatus, and are transmitted to a security and guard client in a UDP broadcast manner. After authenticating the alarm, the security and guard client transmits the alarm to an I/CAD application connected to an interface adapter d of the information processing apparatus via the interface adapter d. After receiving the occurred event, the I/CAD application informs its client and gateway (GW, corresponding to the gateway connector) in time (step 2301), and reports the event to an information processing apparatus of a last step (step 2302).

It can be seen from the above embodiment that with the information processing method of this embodiment, the landslide management system is enabled to achieve various existing application integration more easily, extensibility is good, and independence of various systems is not affected.

Embodiment 2

Figure 29:
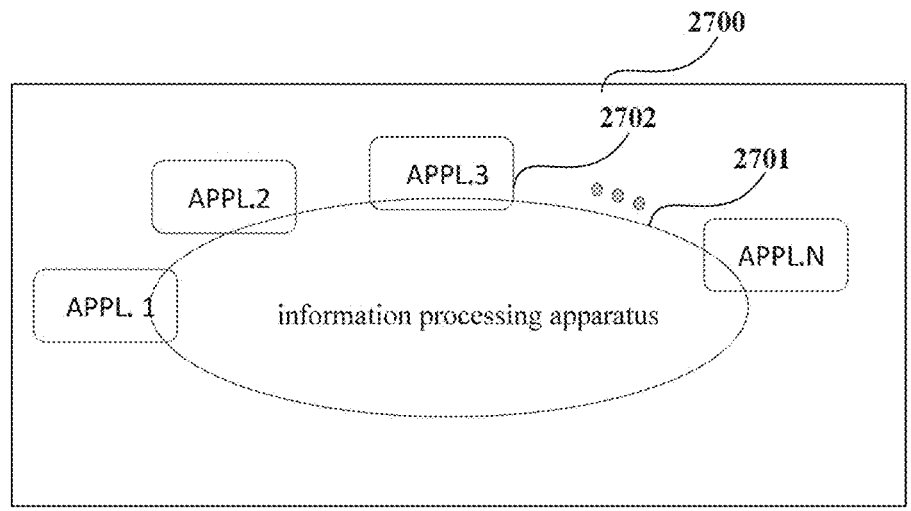
FIG. 29 is a schematic diagram of a structure of an information processing system of Embodiment 2 of the present disclosure.

An embodiment of the present disclosure provides an information processing system. FIG. 29 is a schematic diagram of a structure of the information processing system of Embodiment 2 of the present disclosure. As shown in FIG. 29, the information processing system 2900 includes at least one information processing apparatus 2901 as described in Embodiment 1; wherein, the information processing apparatus 2901 is connected to multiple outer application systems, and uses a preset rule to control, so as to achieve data interaction and function call between the multiple outer application systems.

In an implementation, the number of the information processing apparatuses is more than 2, and the more than 2 information processing apparatuses are connected to each other via gateway connectors, so as to achieve data interaction and function call between different information processing apparatuses.

Figure 30:
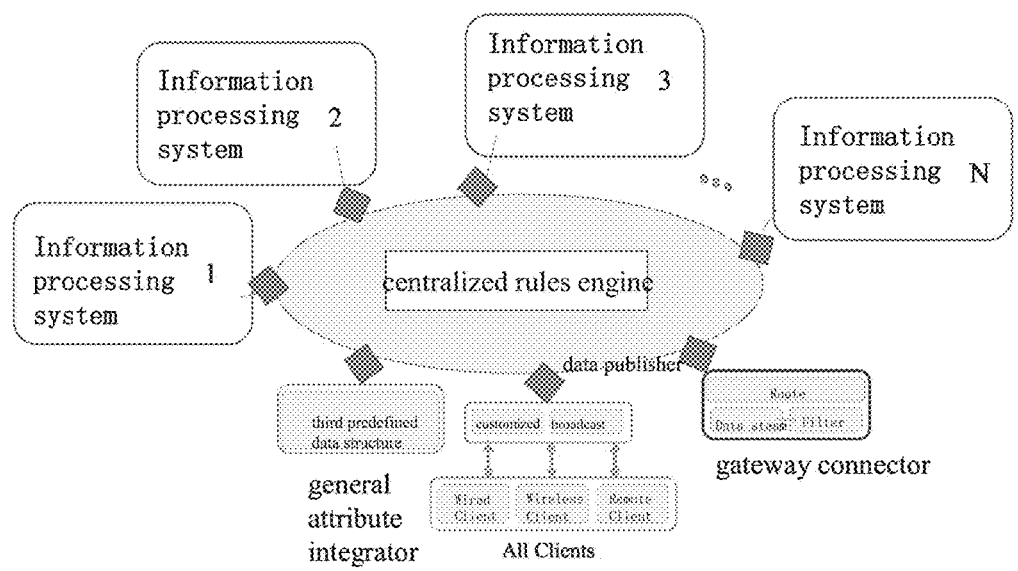
FIG. 30 is a schematic diagram of a structure of an information processing system of Embodiment 2 of the present disclosure.

In this embodiment, FIG. 30 is a schematic diagram of a structure of the information processing system. Wherein, multiple outer application systems may also be the information processing apparatuses 2901 in Embodiment 2.

The above system of this embodiment may be applicable to multiple implementation scenarios. Following description is illustrative only, and this embodiment is not limited thereto.

Figure 31:
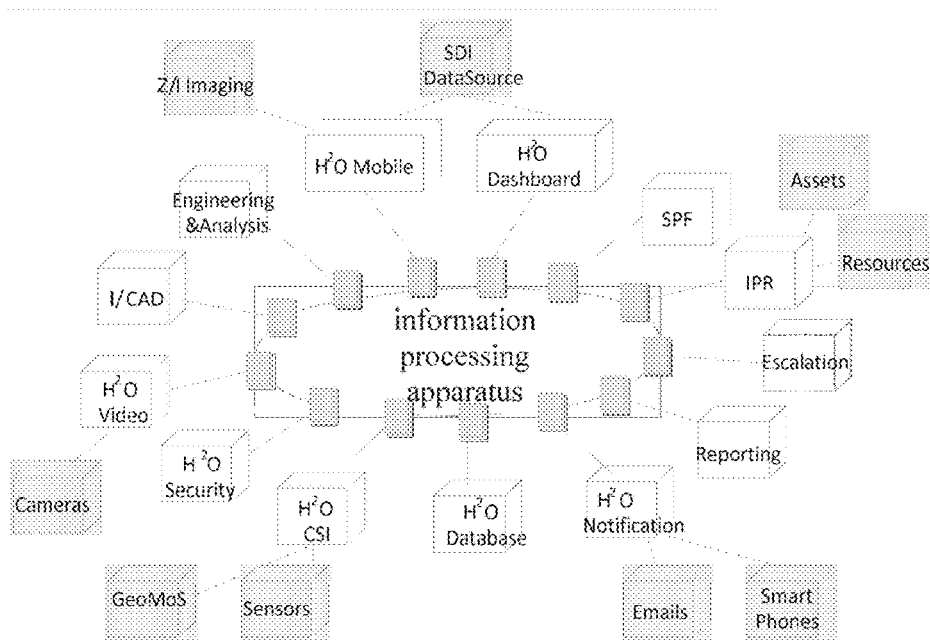
FIG. 31 is a schematic diagram of a structure of a reservoir security management system of Embodiment 2 of the present disclosure.

In an implementation scenario, the system may be applicable to a reservoir security management system. FIG. 31 is a schematic diagram of a structure of the reservoir security management system. As shown in FIG. 31, the system includes multiple service applications, such as a CAD scheduling application, an emergency response application, and a file management application, etc. FIG. 31 is a schematic diagram of a structure of a multi-hierarchy reservoir security management system, and with the system shown in FIG. 31, when water regime, rain regime, work regime, weather, or disaster, etc., of a reservoir, is discovered, real-time monitored information and resource information are shared and reported in time, so as to facilitate emergency command and control.

Figure 32:
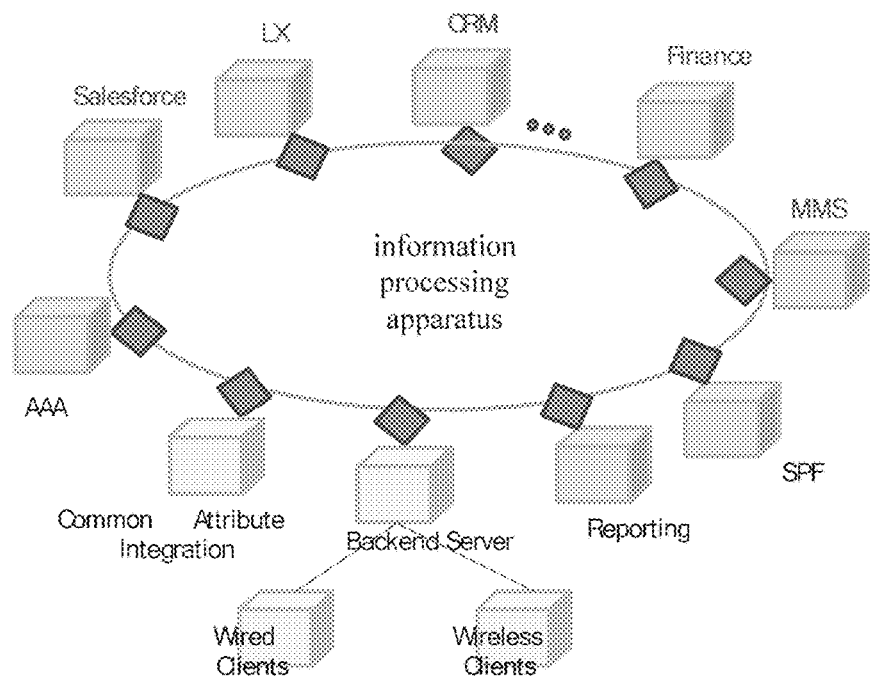
FIG. 32 is a schematic diagram of a structure of an enterprise management system of Embodiment 2 of the present disclosure.

In another implementation scenario, the system may be applicable to enterprise management. FIG. 32 is a schematic diagram of a structure of the enterprise management system. As shown in FIG. 32, the system includes multiple service applications, such as a customer relationship management (CRM) application, financial resource management application, and authentication authorization accounting (AAA) application, etc. And the information processing apparatus may use data of applications connected to the apparatus for performing interaction and achieving data sharing, and may publish the data of the applications to a personal client for timely mastery by an enterprise user, thereby improving efficiency of enterprise management.

The system, apparatus, modules or units described above may be carried out by a computer chip or an entity, or may be carried out by a product having certain functions.

For the convenience of description, the above apparatus is described by respectively describing various units divided according to their functions. Of course, in the implementation of this application, the functions of the units may be carried out in one or more pieces of software and/or hardware.

It can be seen from the above description of the embodiments, those skilled in the art may clearly understand that this application may be carried out by way of software in combination with necessary universal hardware platforms. Based on such understanding, the technical solution of this application may be, substantially or regarding its part contributing to the prior art, embodied in a form of a software product. In typical configuration, a computing device includes one or more central processing units (CPU), input/output interfaces, network interfaces, and memories. The computer software product may include several instructions for enabling a computer device (which may be a personal computer, a server, or a network device, etc.) to carry out the methods described in the embodiments of this application some parts of the embodiments/

The computer software product may be stored in a memory, and the memory may include such forms as a volatile memory, a random access memory (RAM) and/or a nonvolatile memory, etc., in a computer-readable medium, such as a read-only memory (ROM) or a flash RAM. A memory is an example of a computer-readable medium. The computer-readable medium includes volatile and nonvolatile, movable and unmovable media, which may achieve information storage by using any method or technique. The information may be a computer-readable instruction, a data structure, a module of a program, or other data.

Examples of storage media include but not limited to a phase-change RAM (PRAM), a static random access memory (SRAM), a dynamic random access memory (DRAM), other types of random access memories (RAMs), a read-only memory (ROM), an electrically erasable programmable read-only memory (EEPROM), a flash memory or other memory techniques, a compact disc read-only memory (CD-ROM), a digital video disc (DVD) or other optical memories, a cassette tape, a cassette tape memory or other magnetic memory devices, any other non-transmission medium, which may store information accessed by the computing device. As delimited by this text, the computer-readable medium does not include transitory media, such as modulated data signals and carriers.

In this description, for the embodiments of the system, as they are basically similar to those of the methods, they are described in a relatively simple manner, and corresponding parts of the embodiments of the methods may be referred to for the related parts of the system.

This application may be applicable to various universal or specific computer system environments or configuration, such a personal computer, a server computer, a hand-hold device or a portable device, a tablet computer, a multiprocessor system, a microprocessor-based system, a set-top box, a programmable consumable electronic device, a network PC, a miniature computer, a mainframe computer, and a distributed computing environment including any of the above systems or devices.

This application may be described in general context of a computer-executable instruction executed by a computer, such as a program module. In general, the program module includes a routine, a program, an object, an assembly, and a data structure, etc., executing a specific task or carrying out a specific abstract data type. And this application may also be implemented in distributed computing environments, in which tasks are executed by remote processing devices connected via communication networks. In the distributed computing environments, program modules may be located in local and remote computer storage media including storage devices.

Although this application is described by way of embodiments, it is understood by those skilled in the art that this application has many variants and modifications without departing from the spirits of this application, and it is desired that the appended claims cover these variants and modifications without departing from the spirits of this application.

The invention claimed is:

1. An information processing apparatus configured to process geographic-related information, the apparatus comprising:
   one or more interface adapters, each interface adapter being connected to a respective outer application system, and configured to achieve data interaction and function call between the multiple outer application systems;
   a centralized rules engine connected to the one or more interface adapters and configured to use a preset rule to control the data interaction and function call between the multiple outer application systems connected to the interface adapters;
   a general attribute integrator configured to receive data or control information transmitted by the multiple interface adapters, and convert the data or the control information transmitted by the multiple interface adapters into a given predefined data structure; and
   a data publisher configured to publish the data structure converted by the general attribute integrator, so as to provide services to multiple outer clients of the geographic information system.

2. The information processing apparatus according to claim 1, wherein the interface adapter comprises:
   a first interacting unit configured to convert data from the outer application system into a first predefined data structure; and
   a second interacting unit configured to convert control information from the outer application system into a second predefined data structure.

3. The information processing apparatus according to claim 1, wherein the centralized rules engine comprises:
   a setting unit configured to preset the rule, the rule comprising a triggering condition and corresponding processing to be performed; and
   a processing unit configured to perform the corresponding processing according to the rule when the triggering condition is satisfied.

4. The information processing apparatus according to claim 3, wherein the setting unit sets the rule according to one piece of the following information or a combination thereof: information of result drive, event drive, time drive and state drive.

5. The information processing apparatus according to claim 1, wherein the information processing apparatus further comprises:
   a gateway connector configured to be connected to the interface adapters and other information processing apparatuses, so as to achieve data interaction and function call between different information processing apparatuses.

6. The information processing apparatus according to claim 1, wherein the information processing apparatus further comprises:
   a display operator configured to display and operate data and control information outputted by the interface adapters.

7. An information processing system, comprising at least one information processing apparatus as claimed in claim 1, wherein the information processing apparatus is connected to multiple outer application systems via interface adapters, and uses a preset rule to control, so as to achieve data interaction and function call between the multiple outer application systems.

8. The information processing system according to claim 7, wherein the number of the information processing apparatuses is more than 2, and the more than 2 information processing apparatuses are connected to each other via a gateway connector, so as to achieve data interaction and function call between different information processing apparatuses.

9. An information processing method for processing geographic-related information, the method comprising:
receiving, by an interface adapter, data and control information transmitted by an outer application system;
converting the data and control information from the outer application system by the interface adapter into a predefined data structure; and
transmitting it to a centralized rules engine, so that the centralized rules engine controls data interaction and function call between the multiple outer application systems connected to the multiple interface adapters according to a preset rule; and
transmitting the predefined data structure converted by the interface adapter to a general attribute integrator, so that the general attribute integrator converts the received data structure into a given predefined data structure and transmits it to a data publisher, such that the data publisher publishes the received data in a broadcast or customized manner to multiple outer clients.

10. The information processing method according to claim 9, wherein the converting the data and control information from the outer application system by the interface adapter into a predefined data structure comprises:
converting the data from the outer application system into a first predefined data structure; and
converting the control information from the outer application system into a second predefined data structure.

11. The information processing method according to claim 9, wherein the method further comprises:
transmitting the converted predefined data structure by the interface adapter to a gateway connector via a second interface adapter connected to the gateway connector, so that the gateway connector transmits the received data structure to other information processing apparatuses.

12. The information processing method according to claim 9, wherein the centralized rules engine controlling data interaction and function call between the multiple outer application systems connected to the interface adapters according to a preset rule comprises: presetting the rule, the rule comprising a triggering condition and corresponding processing to be performed; and performing the corresponding processing according to the rule when the triggering condition is satisfied.

13. The information processing method according to claim 12, wherein the rule is set according to one piece of the following information or a combination thereof: information of result drive, event drive, time drive and state drive.

14. The information processing method according to claim 9, wherein converting data and control information from outer application systems into a predefined data structure transmitted via interface adapters comprises:
converting the data from the outer application systems into a first predefined data structure; and
converting the control information from the outer application systems into a second predefined data structure.

15. The information processing method according to claim 10, wherein the controlling data interaction and function call between the multiple outer application systems connected to the interface adapters by the centralized rules engine according to a preset rule comprises: presetting the rule, the rule comprising a triggering condition and corresponding processing to be performed; and performing the corresponding processing according to the rule when the triggering condition is satisfied.

16. The information processing method according to claim 9, wherein the rule is set according to one piece of the following information or a combination thereof: information of result drive, event drive, time drive and state drive.

17. An information processing method for processing geographic-related information, the method comprising:
receiving by a centralized rules engine, a predefined data structure converted from data and control information from outer application systems transmitted via interface adapters;
controlling data interaction and function call between the multiple outer application systems connected to the multiple interface adapters by the centralized rules engine according to a preset rule and
transmitting the predefined data structure converted by the interface adapter to a general attribute integrator, so that the general attribute integrator converts the received predefined data structures into a given predefined data structure and transmits it to a data publisher, such that the data publisher publishes the received data in a broadcast or customized manner to multiple outer clients.

* * * * *

UNITED STATES PATENT AND TRADEMARK OFFICE
CERTIFICATE OF CORRECTION

PATENT NO.        : 10,176,024 B2
APPLICATION NO.   : 15/316906
DATED             : January 8, 2019
INVENTOR(S)       : Wang et al.

Page 1 of 1

It is certified that error appears in the above-identified patent and that said Letters Patent is hereby corrected as shown below:

In the Claims

At Column 12, Lines 21-22, delete the phrase "of the geographic information system".

At Column 13, Line 11, replace the ";" with a --,--.

At Column 14, Line 42, change the word "structures" to --structure--.

Signed and Sealed this
Seventh Day of May, 2019

Andrei Iancu
*Director of the United States Patent and Trademark Office*